United States Patent [19]

Inagaki et al.

[11] Patent Number: 4,999,281
[45] Date of Patent: Mar. 12, 1991

[54] OPTICAL INFORMATION RECORDING MEDIUM

[75] Inventors: Yoshio Inagaki; Keiichi Adachi, both of Minami-Ashigara; Masao Yabe, Fujinomiya, all of Japan

[73] Assignee: Fuji Photo Film Co., Ltd., Kanagawa, Japan

[21] Appl. No.: 233,132

[22] Filed: Aug. 17, 1988

[30] Foreign Application Priority Data

Aug. 20, 1987 [JP] Japan ............................. 62-207175

[51] Int. Cl.⁵ .......................... G11B 7/24; G03C 1/73
[52] U.S. Cl. .................................. 430/495; 430/270; 430/945
[58] Field of Search ..................... 430/270, 495, 945

[56] References Cited

U.S. PATENT DOCUMENTS

| | | |
|---|---|---|
| 4,460,665 | 7/1984 | Kunikane et al. . |
| 4,547,444 | 10/1985 | Bell et al. ................ 430/11 |
| 4,659,177 | 4/1987 | Choe et al. . |
| 4,730,902 | 3/1988 | Suzuki et al. . |
| 4,732,783 | 3/1988 | Choe et al. . |
| 4,735,839 | 4/1988 | Sato et al. ............... 428/64 |
| 4,735,889 | 5/1988 | Namba et al. ............ 430/273 |
| 4,753,867 | 6/1988 | Arakawa et al. . |
| 4,761,181 | 8/1988 | Suzuki et al. . |
| 4,763,966 | 8/1988 | Suzuki et al. . |
| 4,767,571 | 8/1988 | Suzuki et al. . |
| 4,767,696 | 8/1988 | Ishimoto et al. . |
| 4,791,023 | 12/1988 | Suzuki et al. . |
| 4,851,322 | 7/1989 | Inagaki et al. . |

FOREIGN PATENT DOCUMENTS 0230024 7/1987 European Pat. Off. .

Primary Examiner—Paul R. Michl
Assistant Examiner—Mark R. Buscher
Attorney, Agent, or Firm—Birch, Stewart, Kolasch & Birch

[57] ABSTRACT

An optical information recording medium for carrying out recording, readout or erasing with layer beams, which comprises a support having carried thereon at least one compound represented by the general formula (I):

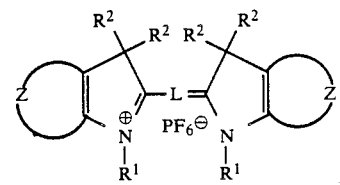

wherein $R^1$ and $R^2$ independently represent substituted or unsubstituted alkyl groups, or substituted or unsubstituted aryl groups, Z represents an atomic group for forming a substituted or unsubstituted aromatic ring, and L represents a linking group for forming a carbocyanine.

The present optical information recording media have an excellent recording performance and stability, and dyes used therein have no explosive property and thus can safely and readily be prepared.

17 Claims, No Drawings

OPTICAL INFORMATION RECORDING MEDIUM

BACKGROUND OF THE INVENTION

1. Field of the Invention

The present invention relates to a heat mode type optical information recording medium which has an organic dye thin film and wherein recording and readout are carried out by causing a change of state with a high density energy beam.

2. Discussion of Related Art

Heretofore, information recording media wherein recording and readout of information are carried out by irradiating a rotating disc-shaped information recording medium with a laser beam have been known. As recording layers in these information media, there are, for example, those recording layers proposed wherein a metal having a low melting point and a dielectric substance are used. However, these recording layers have disadvantages such as poor preservability, low separating ability, low recording density and high manufacturing cost. Recently, it has been proposed and practised that dye thin films whose physical properties can be changed with light of relatively long wavelength are used in the recording layers. However, dyes which have absorption bands in long wavelength generally have problems, for example a problem that they have only low stabilities against heat and light. Thus, it is the present state of things that recording layers having recording characteristics which are stable and satisfactory over a long period have not yet been developed.

Indolenine series heptamethinecyanine dyes as disclosed, for example, in Japanese Patent Unexamined Published Application (hereinafter referred to as "J. P. KOKAI") No. 59-202892 have been known as dyes having the best recording characteristics and stability among dyes having hitherto been disclosed for recording layers.

Further, U.S. Pat. No. 4,460,665 discloses an optical information recording medium wherein a cyanine dye is used, and J.P. KOKAI Nos. 59-24692, 59-85791 and 59-67092 disclose optical information recording media wherein indolenin cyanine dyes are used. In this connection, it has been known that the stability of recording layers comprising a cyanine dye is greatly influenced by the structure of its counter anion (for example, compare Comparative example 1 with Comparative example 4 of J.P. KOKAI No. 59-202892), and most stable recording layers have been obtained when the perchlorate ion had been used among the counter anions as previously disclosed. However, most perchlorate are generally explosive and moreover DSC (Differential Scanning Calorimetry) measurement has shown that perchlorates of cyanine dyes decompose with very large thermal emission, and thus it has been suggested that they are in high danger of explosion during handling (e.g., preparation). Therefore, optical information recording media have been desired comprising a cyanine dye which have a recording performance and stability of the recording layer equal to or superior to that of perchlorates of cyanine dyes, and are further free from danger of explosion.

SUMMARY OF THE INVENTION

Thus, an object of the present invention is to provide optical information recording media comprising a cyanine dye which can form the recording layer of an optical information recording medium capable of maintaining adequate recording characteristics over a long period and thus excellent in stability, and moreover, is free from danger of explosion and has a good solubility in organic solvents.

The above object has been accomplished by an optical information recording medium which comprises a support having carried thereon as a dye at least one of compounds represented by the following general formula (I).

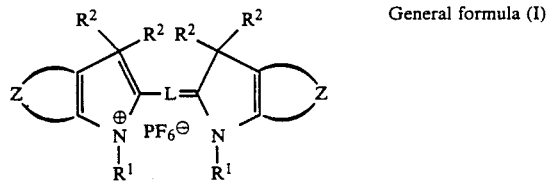

General formula (I)

wherein $R^1$ and $R^2$ independently represent an alkyl group or an aryl group, Z represents an atomic group necessary for forming an aromatic ring, and L represents a linking group necessary for forming a carbocyanine.

$R^1$, $R^2$ and Z in the general formula (I) may have substituent(s). Preferred substituents on these groups are those having $\pi$, a hydrophobic parameter proposed by C. Hansch et al. in the range of $-0.5$ to 15. Hydrophobic parameters can be calculated according to the description of the following literature.

(1) C. Hansh et al., J. Med. Chem., 16, 1207 (1973)

(2) C. Hansh et al., ibid. 20, 304 (1977)

Preferred groups among those represented by $R^1$ or $R^2$ are substituted or unsubstituted lower alkyl groups (having 1 to 8 carbon atoms), and, when these groups have substituent(s), are lower alkyl groups wherein the substituent(s) has(have) a hydrophobic parameter $\pi$ of $-0.5$ to 15. Particularly preferred substituents when $R^1$ or $R^2$ has substituent(s), are halogen atoms (F, Cl, Br and I), substituted or unsubstituted phenyl groups (for example, a phenyl group, a m-chlorophenyl group, a p-methylphenyl group, etc.), alkylthio groups (for example, a methylthio group, a butylthio group, etc.), substituted or unsubstituted phenylthio groups (for example, a phenylthio group, a p-chlorophenylthio group, a m-methylphenylthio group, etc.).

Particularly preferred groups among those represented by $R^1$ or $R^2$ are unsubstituted alkyl groups having 1 to 4 carbon atoms, and a methyl group is especially preferable among them.

Examples of an atomic group represented by Z include atomic groups for completing a benzene ring, a naphthalene ring and an anthracene ring, and preferred examples include atomic groups for completing a benzene ring and a naphthalene ring, and these atomic groups may have the above substituent(s): Particularly preferred substituents when Z has a substituent include halogen atoms (F, Cl, Br and I), substituted or unsubstituted phenyl groups (for example, a phenyl group, a m-chlorophenyl group, a p-methylphenyl group, etc.), alkylthio groups (for example, a methylthio group, a butylthio group, etc.), substituted or unsubstituted phenylthio group (for example, a phenylthio group, a p-chlorophenylthio group, a m-methylphenylthio group, etc.), substituted or unsubstituted alkyl groups (for example, a methyl group, a trifluoromethyl group, a tert-amyl group, etc.), a cyano group, alkoxycarbonyl groups (for example, a propoxycarbonyl group, a butoxycarbonyl group, a benzyloxycarbonyl group, a decyloxycarbonyl group, a 2-ethylhexyloxycarbonyl group, etc.), and alkyl or arylsulfonyl groups (for example, a butanesulfonyl group, a phenylsulfonyl group, an octanesulfonyl group, etc.)

Particularly preferred atomic groups among those represented by Z are atomic groups for forming a benzene ring substituted with substituent(s) having a relatively weak electron donative property, for example substituent(s) having Hammett's sigma constant of −0.2 to +0.7. Among them are preferable atomic groups for forming a benzene group substituted with halogen atom(s) such as F, Cl, Br or I.

The linking group represented by L represents a linking group necessary for forming a mono-, di-, tri- or tetracarbocyanine dye, and those represented by the general formulae (a) to (i) are particularly preferred.

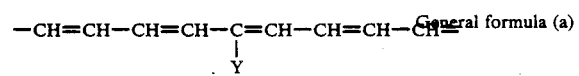

General formula (a)

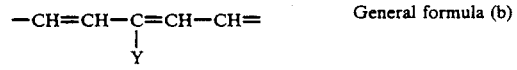

General formula (b)

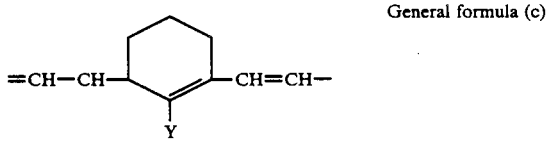

General formula (c)

General formula (d)

General formula (e)

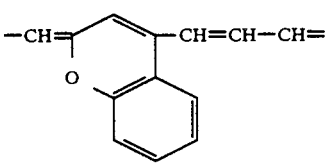

General formula (f)

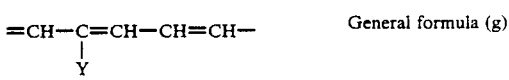

General formula (g)

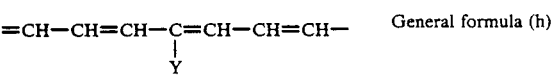

General formula (h)

General formula (i)

Y in the general formulae (a) to (i) represents a hydrogen atom or a monovalent group. As such monovalent groups, are preferable a lower alkyl group such as a methyl group; a substituted or unsubstituted phenyl group; an aralkyl group such as a benzyl group; a lower alkoxy group such as a methoxy group; a disubstituted amino group such as a dimethylamino, diphenylamino, methylphenylamino, morpholino, imidazolidino or ethoxycarbonylpiperazino group; an alkylcarbonyloxy group such as an acetoxy group; an alkylthio group such as a methylthio group; a cyano group; a nitro group; a halogen atom such as F, Cl or Br; etc.

Particularly preferred linking groups among those represented by L are linking groups necessary for forming a di- or tricarbocyanine dye, and more specifically those represented by the general formulae (b), (c), (d), (e), (f), (g) and (h).

Specific examples of compounds represented by the general formula (I) of the present invention are indicated below, but the scope of the present invention should not be limited thereto.

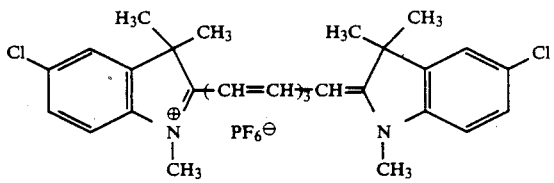

1.

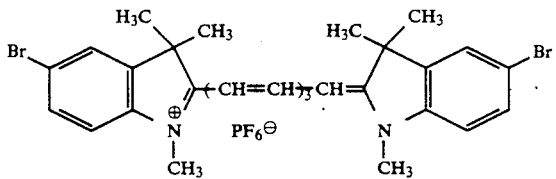

2.

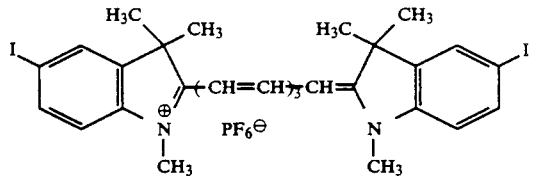

3.

-continued
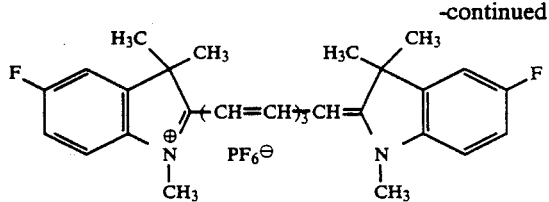 4.
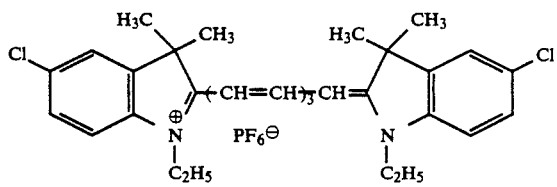 5.
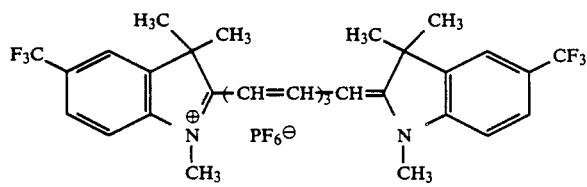 6.
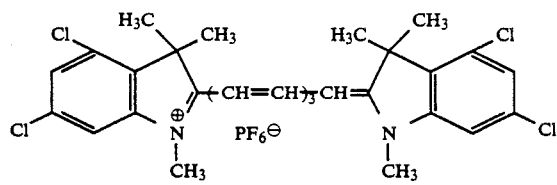 7.
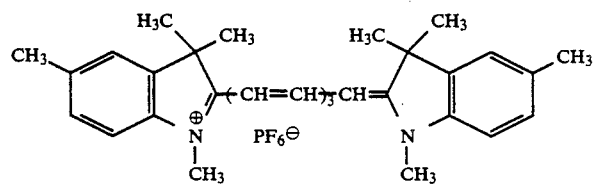 8.
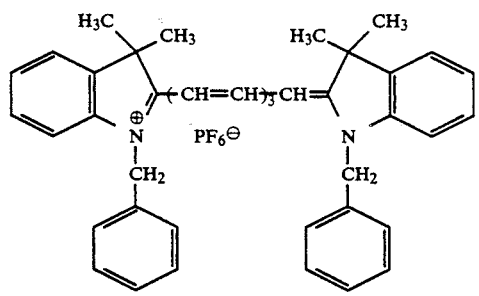 9.
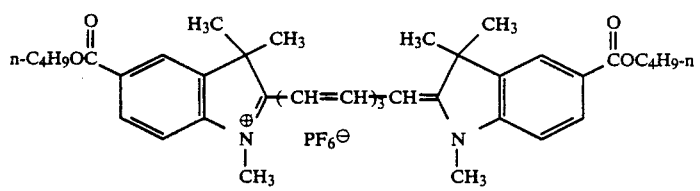 10.
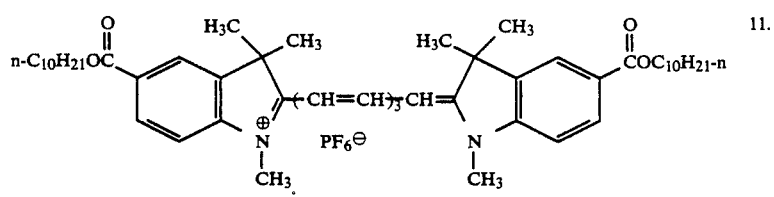 11.

-continued

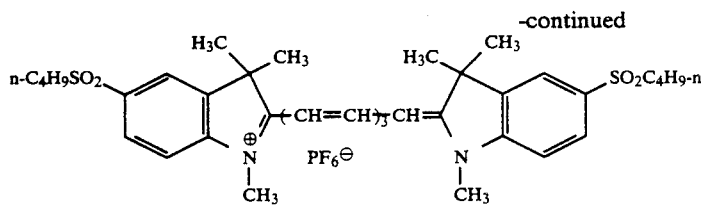

12.

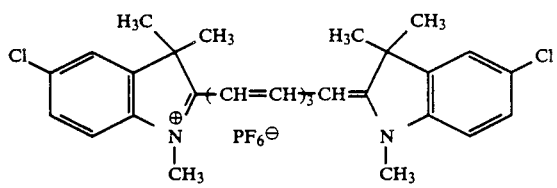

13.

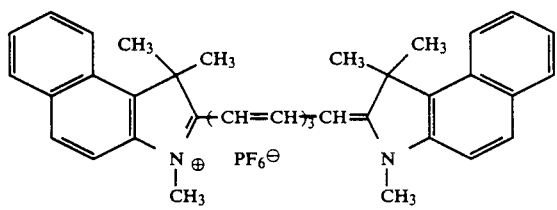

14.

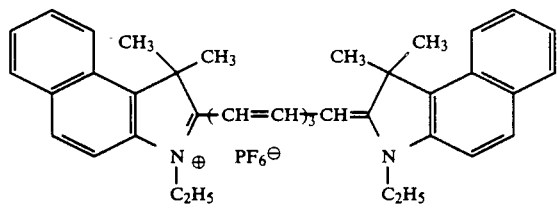

15.

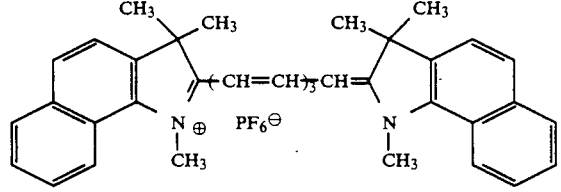

16.

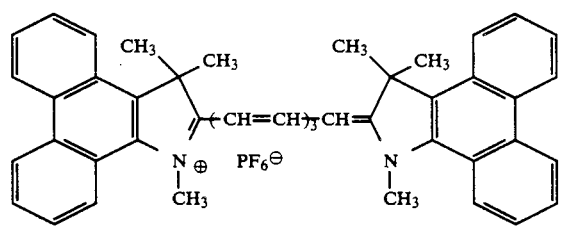

17.

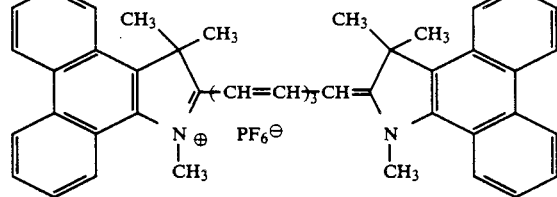

Compounds of the present invention can be synthesized by conventional methods. Most conveniently, these compounds can be synthesized by adding an aqueous $HPF_6$ solution to a solution of a cyanine dye salt in a proper solvent to precipitate a $PF_6^\ominus$ salt of the cyanine dye, or by reacting a $PF_6^\ominus$ salt such as $KPF_6$ or benzyltrimethylammonium hexafluorophosphate with a cyanine dye salt in a proper solvent to precipitate a $PF_6^\ominus$ salt of the cyanine dye.

Syntheses methods of the present compounds are described below by synthetic examples.

SYNTHETIC EXAMPLE 1

Synthesis of Compound 1 (Method by salt exchange)

A solution prepared from 3.5 g of benzyltrimethylammonium hexafluorophosphate and 100 ml of methanol was warmed to 38° C. and added to a solution prepared from 5.1 g of 1-methyl-2-[7-(1-methyl-3,3-dimethyl-5-chloro-2-indolinylidene)-1,3,5-heptatrienyl]-3,3-dimethyl-5-chloroindolium chloride and 50 ml of methanol while the latter solution was warmed to 38° C. The reaction solution was stirred at 38° C. for 15 minutes, and the resulting precipitate was collected by filtration, washed with 50 ml of methanol of 38° C. and air-dried. Yield 5.5 g (89%), m.p. 213°–214° C.

SYNTHETIC EXAMPLE 2

Synthesis of Compound 1 (Method using $HPF_6$)

75 ml of Methanol was added to 2.5 g of 1-methyl-2-[7-(1-methyl-3,3-dimethyl-5-chloro-2-indolinylidene)-

1,3,5-heptatrienyl]-3,3-dimethyl-5-chloroindolium chloride to make a solution, and 1.5 ml of $HPF_6$ (60% aqueous solution) was then added thereto followed by stirring for 15 minutes. The resulting precipitate was collected by filtration, washed with methanol and air-dried. Yield 2.5 g.

Dyes used in the optical recording media of the present invention may be used alone or in combination of two or more, or may be used together with dyes other than dyes of the present invention. Further, it is also effective to use various antioxidants or singlet oxygen quenchers together therewith for enhancement of reading durability. Further, various resins may also be used.

It is also possible to increase reading durability by adding transition metal ions thereto to form chelate compounds with methine dyes of the invention.

Various singlet oxygen quenchers can be used in optical recording media of the present invention. Preferred quenchers are transition metal complexes which reduce deterioration by readout and have good compatibility with dyes. Preferred center metals are Ni, Co, Cu, Pd, Pt and the like.

Examples of novel quenchers which can be used in the present invention include those represented by the genreal formulae (II) and (III) disclosed in J.P. KOKAI No. 62-174741:

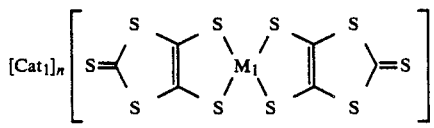
(II)

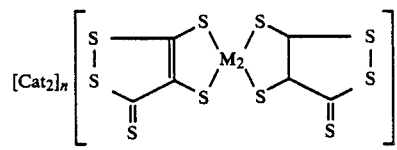
(III)

wherein [Cat$_1$] and [Cat$_2$] independently represent a cation necessary for making the complex neutral, $M_1$ and $M_2$ independently represent nickel, copper, cobalt, palladium or platinum, and n represents 1 or 2.

Examples of an inorganic cation in the cation represented by [Cat$_1$] or [Cat$_2$] in the aforesaid general formula (II) or (III) include alkali metal ions such as $Li^+$, $Na^+$ and $K^+$, alkaline earth metal ions such as $Mg^{2+}$, $Ca^{2+}$ and $Ba^{2+}$.

Further, examples of an organic cation therein include quaternary ammonium ions and quaternary phosphonium ions.

Preferred cations among the above cations [Cat$_1$] and [Cat$_2$] are those represented by the following general formulae (IV-a), (IV-b), (IV-c), (IV-d) and (IV-e):

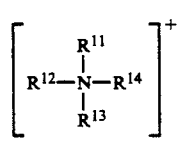
(IV-a)

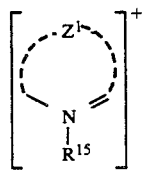
(IV-b)

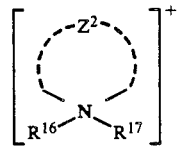
(IV-c)

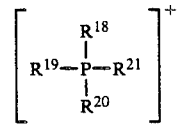
(IV-d)

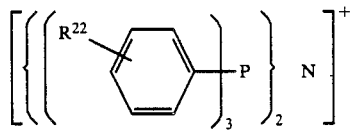
(IV-e)

wherein $R^{11}$, $R^{12}$, $R^{13}$, $R^{14}$, $R^{15}$, $R^{16}$, $R^{17}$, $R^{18}$, $R^{19}$, $R^{20}$, $R^{21}$ and $R^{22}$ independently represent a substituted or unsubstituted alkyl group having 1 to 20 carbon atoms, or a substituted or unsubstituted aryl group having 6 to 14 carbon atoms, and $Z^1$ and $Z^2$ independently represent a nonmetal atomic group which forms 5-membered or 6-membered ring together with a nitrogen atom or a phosphorous atom in the formula.

The above substituted or unsubstituted alkyl group having 1 to 20 carbon atoms includes, for example a methyl group, an ethyl group, a n-butyl group, an iso-amyl group, a n-dodecyl group and n-octadecyl group. The aryl group having 6 to 14 carbon atoms include, for example a phenyl group, a tolyl group and an α-naphthyl group.

These alkyl groups and aryl groups may respectively be substituted with a cyano group, a hydroxyl group, an alkyl group having 1 to 20 carbon atoms (e.g., a methyl group, an ethyl group, an n-butyl group or an n-octyl group), an aryl group having 6 to 14 carbon atoms (e.g., a phenyl group, a tolyl group or an α-naphthyl group), an acyloxy group having 2 to 20 carbon atoms (e.g., an acetoxy group, a benzoyloxy group or p-methoxybenzoyloxy group), an alkoxy group having 1 to 6 carbon atoms (e.g., a methoxy group, an ethoxy group, a propoxy group or a butoxy group), an aryloxy group (e.g., a phenoxy group or a tolyloxy group), an aralkyl group (e.g., a benzyl group, or a phenethyl group), an alkoxycarbonyl group (e.g., a methoxycarbonyl group, an ethyoxycarbonyl group or an n-butoxycarbonyl group), an aryloxycarbonyl group (e.g., a phenoxycarbonyl group or a tolyloxycarbonyl group), an acyl group (e.g., an acetyl group or a benzoyl group), an acylamino group (e.g., an acetylamino group or a benzoylamino group), a substituted or unsubstituted carbamoyl group (e.g., an N-ethylcarbamoyl group or an N-phenylcarbamoyl group), an alkylsulfonylamino group (e.g., a methylsulfonylamino group), an arylsulfonylamino group (e.g., a phenylsulfonylamino group), a substituted or unsubstitued sulfamoyl group (e.g., an N-ethylsulfamoyl group or an N-phenylsulfamoyl group), an alkyl- or arylsulfonyl group (e.g., a mesyl group or a tosyl group) or the like.

$Z^1$ and $Z^2$ independently represent a nonmetal atomic group necessary for forming a 5-membered ring or a 6-membered ring as mentioned above. The 5-membered ring or 6-membered ring may include a pyridine ring, an imidazole ring, a pyrrole ring, a 2-pyrroline ring, a pyrrolidine ring, a piperidine ring, a pyrazole ring, a pyrazoline ring, an imidazoline ring, etc.

Cations represented by the general formula (IV-b) may include, for example, a dodecylpyridinium group, a hexadecylpyridinium group and a dodecylimidazolium group. Cations represented by the general formula (IV-c) may include, for example, an N-ethyl-N-hexadecylpiperidinium group and an N-ethyl-N-dodecylpyrazolidinium group.

Cations preferably used in the present invention among cations represented by the above general formulae (IV-a), (IV-b), (IV-c), (IV-d) and (IV-e) are those represented by (IV-a), (IV-b), (IV-d) and (IV-e) in view of availability of the raw materials and preparation cost.

The kind of these cations [Cat$_1$] and [Cat$_2$] has influence on the solubilities of compounds represented by the aforesaid general formula (II) or (III) in organic solvents.

In general, when substituents linking to the quaternary hetero atom are alkyl groups, solubility of the compound increases as the chain lengths of the alkyl groups become longer. This tendency is remarkable in case of tetraalkyl substituted ammonium or tetraalkyl substituted phosphonium, and cations having a total carbon number of 17 or more in case of ammonium cations and cations having a total carbon number of 4 or more in case of phosphonium cations bestow high solubilities on the compounds, respectively.

Enumeration of $M_1$ or $M_2$ in the compounds represented by the general formula (II) or (III) in order of preference is nickel, cobalt, copper, palladium and platinum.

The metal complexes of the general formula (II) or (III) have stereostructures of plane four coordination. Though it cannot be definitely determined whether the thioketone groups in the compounds of the general formula (III) exist symmetrically or unsymmetrically in relation to the center metal, the thioketone groups are represented for convenience's sake as in the general formula (III) in the present specification.

The compounds represented by the aforesaid general formula (II) or (III) can be synthesized as follows.

A compound of the general formula (II) (n=2): Disodium 1,3-dithiol-2-thione-4,5-dithiolate obtained by reacting carbon disulfide with sodium is converted to a zinc complex, and benzoyl chloride is reacted with the complex to form a bisbenzoylthio compound After decomposition with an alkali, the bisbenzoylthio compound is reacted with a metal salt to obtain the captioned compound.

Further, a compound of the general formula (II) (n=1) can be obtained by oxidizing a complex obtained as abovedescribed (n=2) with a proper oxidizing agent.

A compound of the general formula (III) (n=2): First, disodium 1,3-dithiol-2-thione-4,5-dithiolate obtained by reaction of carbon disulfide with sodium is heated to above 130° C. to isomerize it to disodium 1,2-dithiol-3-thione-4,5-dithiolate. Then, this dithiolate is converted to a zinc complex, and benzoyl chloride is reacted with the zinc complex to form a bisbenzoylthio compound, which is then decomposed with an alkali and reacted with a metal salt to obtain the captioned compound.

A compound of the general formula (III) (n=1) can be obtained by oxidizing the complex obtained as above-described (n=2) with a proper oxidizing agent.

Further, the 1,3-dithiol-2-thione-4,5-dithiolate anion which is an intermediate for obtaining a compound of the general formula (II) or (III) can also be obtained by electrochemical reduction besides the Na-reduction method described above.

Preferred compounds among those represented by the aforesaid general formulae (II) are illustrated as follows:

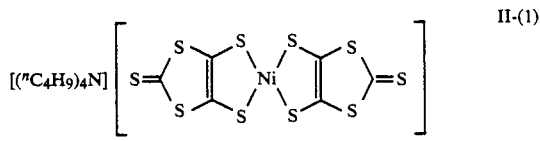

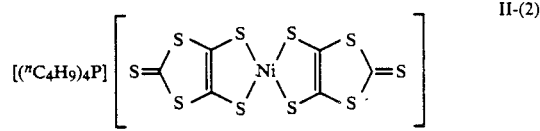

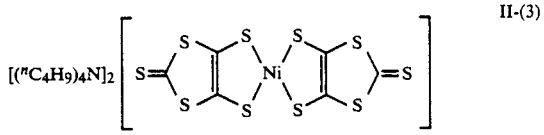

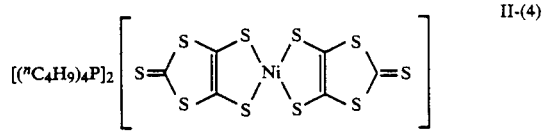

Synthetic examples of compounds represented by the general formula (II) are described below.

SYNTHETIC EXAMPLE 3

Synthesis of exemplified compound (II-4)

(1-1) Synthesis of bis(tetraethylammonium)-bis (1,3-dithiol-2-thione-4,5-dithiolato) zinc complex All reaction procedures were conducted under an argon atmosphere. 23 g Sodium was cut into small pieces and dispersed in 180 ml of carbon disulfide, followed by slow dropwise addition of 200 ml of dimethylformamide thereto while stirring. During the dropwise addition, caution should be given so that the mixture does not rapidly generate heat. After the dropwise addition of dimethylformamide, the mixture was gently heated with caution and refluxed for 24 hours. After completion of the reaction the unreacted sodium was removed by filtration. Then, 50 ml of ethanol was added to the filtrate, and the mixture was stirred at room temperature for 2 hours. Carbon disulfide was distilled away from this solution at room temperature under reduced pressure. Then, 300 ml of water was slowly added dropwise thereto and the resulting solution was filtered.

Separately in advance, 20 g of zinc chloride was dissolved in 500 ml of methanol and 500 ml of concentrated ammonia water was added thereto to prepare a solution. This solution was added to the above filtrate at room temperature. After stirring for 5 minutes, an aqueous solution of 53 g of tetraethylammonium bromide in 250 ml of water was added to the mixture to immediately form a red precipitate, which was collected by filtration and air-dried to obtain the captioned zinc complex.

(1-2) Synthesis of 4,5-bis(benzoylthio)-1,3-dithiol-2-thione

The zinc complex (22 g) obtained in (1-1) was dissolved in 500 ml of acetone and filtered. 150 ml of benzoyl chloride was added to the filtrate with stirring to form immediately a yellow precipitate. The precipitate was collected by filtration, washed with water and air-dried to obtain 16 g of the cationed compound.

(1-3) Synthesis of exemplified compound (II-4)

The bis(benzoylthio) compound (9.2 g) obtained in (1-2) was dissolved in 50 ml of methanol. Then, 6.3 g of a 28% methanol solution of sodium methoxide was added thereto, followed by stirring for 10 minutes. To this solution was added a solution of 2.4 g of nickel chloride hexahydrate in 50 ml of methanol, and the mixture was stirred at room temperature for 30 minutes. To the resulting solution was added a solution of 8.5 g of tetrabutylphosphonium bromide in 100 ml of methanol to form immediately a black precipitate. The mixture was stirred for additional 20 minutes and filtered. The solid was washed with acetone, air-dried and recrystallized from acetone-isopropyl alcohol to obtain the captioned compound. Yield 3.8 g.

SYNTHETIC EXAMPLE 4

Synthesis of exemplified compound (II-2)

The nickel complex (1 g) obtained in (1-3) was dissolved in 60 ml of acetone, and 30 ml of acetic acid was added thereto. The mixture was stirred for 3 hours and the solvent was distilled away to form black crystals, which was then recrystallized from acetone-methanol to obtain the desired exemplified compound (II-2). Yield 0.4 g, m.p. 185° C., λmax: 1125 nm, εmax: $2.51 \times 10^4$ (in $CH_2Cl_2$).

Examples of known quenchers which may be used in the present invention include the following compounds disclosed in J. P. KOKAI No. 59-178295.

(i) Bisdithio-α-diketones

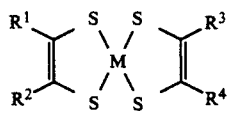

wherein $R^1$ to $R^4$ independently represent alkyl or aryl groups, and M represents a divalent transition metal atom.

(ii) Bisphenyldithiols

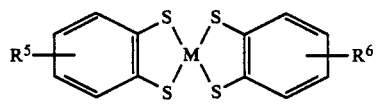

wherein $R^5$ and $R^6$ independently represent alkyl groups or halogen atoms, and M represents a divalent transition metal atom.

(iii) Acetylacetonate chelates
(iv) Dithiocarbamic acid chelates
(v) Bisphenylthiols
(vi) Thiocatechol chelates
(vii) Salicylaldehyde oximes
(viii) Thiobisphenolate chelates
(ix) Phosphonous acid chelates
(x) Benzoates
(xi) Hindered amines
(xii) Transition metal salts Besides the above compounds, aminium or diimonium compounds represented by the following formula may also be used in the invention as known quenchers:

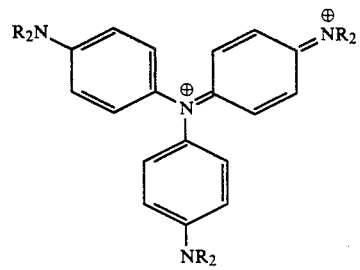

wherein R represents an alkyl group or an aryl group. Specific examples thereof include IRG-002, IRG-003, ITG-022 and IRG-023 manufactured by NIPPON KAYAKU CO., LTD.

A combination of a cation of a dye of the general formula (I) and an anion of a quencher can also be used in the invention.

A quencher is generally used in an amount of 0.05 to 12 moles, preferably 0.1 to 1.2 moles per mole of the dye of the general formula (I).

Although a quencher is preferably contained in the dye thin film recording layer, it may be contained in layer different from the recording layer. It is possible, according to necessity, to provide a subbing layer on the support, a protective layer on the recording layer, and/or a reflecting layer on the support or on the recording layer in the optical recording medium of the invention.

Known supports can optionally be used as a support. Typical examples thereof include glasses and plastics such as acrylics, polycarbonates, polysulfones, polyimides, amorphous polyolefins, epoxy resins, polyesters, etc. The support can be used in various shapes such as disc-like, card-like, sheet-like and roll film-like shapes.

A groove may be formed on the glass or plastic support in order to make tracking during recording easier. Further, a subbing layer of a plastic binder, an inorganic oxide, an inorganic sulfide or the like may be provided on the glass or plastic support. A subbing layer having a thermal conductivity lower than that of the support is preferable. Further, it is also possible to make two recording media facing with each other so that both recording layers are inside, namely to arrange two recording media in the form of so-called air sandwich structure.

The recording layer in the present invention can be formed, for example, by dissolving the dye represented by the general formula (I) and a quencher in an organic solvent (for example, methanol, ethanol, isopropyl alcohol, a fluorinated alcohol such as 2,2,3,3-tetrafluoropropanol, dichloromethane, dichloroethane or acetone), and, if necessary, adding a proper binder (for example, PVA, PVP, polyvinyl butyral, polycarbonate, nitrocellulose, polyvinyl formal, methyl vinyl ether, chlorinated paraffin, maleic anhydride copolymer, styrene-butadiene copolymer or xylene resin), and applying the solution (for example by spin coating) onto a support. The recording layer can also be formed by co-depositing the dye represented by the general formula (I) and a quencher on a support, or by vacuum-depositing the dye represented by the general formula (I) and then applying a quencher on a support, or by vacuum-depositing the dye represented by the general formula (I) and then applying a quencher. The dye represented by the formula (I) is preferably used in an amount of $10^{-10} \sim 10^{-6}$ mole, more preferably $10^{-9} \sim 10^{-7}$ mole per square cm of the recording layer. When a binder is used, it is preferable to use it in an amount of 0.01 to 2 times the weight of the dye. Further, it is also possible to form a thin film according to so-called Langmuir-Blodgett's technique using a dye of the general formula (I).

It is possible to provide one or more of the recording layers in the present invention.

An antioxidant or a fading inhibitor may be contained in the recording layer or a layer adjacent thereto in order to inhibit deterioration of the dye.

The film thickness of the recording layer is usually in the range of 0.01 to 2 micrometers, preferably in the range of 0.02 to 0.8 micrometer. In case of reflection reading, it is particularly preferable that the thickness is an odd number times the ¼ of laser wave length used for readout.

When a layer for reflecting semiconductor laser, He-Ne laser or the like is provided, the optical recording medium of the present invention may be made either by providing a reflecting layer on a support and then providing a recording layer on the reflecting layer in such a manner as aforementioned, or by providing a recording layer on a support and then providing a reflecting layer thereon.

The reflecting layer may be provided in such a manner as described below besides a sputterin method, an ion plating method or the like.

For example, a solution which is prepared by dissolving a metal salt or a metal complex salt in a water soluble resin (PVP, PVA or the like) and further adding a reducing agent thereto is applied onto a support and the resulting support is dried with heating at 50° to 150° C., preferably 60° to 100° C., whereby a reflecting layer is provided thereon.

The metal salt or the metal complex salt is used in a weight ratio of 0.1 to 10, preferably 0.5 to 1.5 based on the resin. Further, as for the thickness of the recording layer, it is proper that the thickness of the metal particle reflecting layer is in the range of 0.01 to 0.1 micrometer and that of the light absorption layer is in the range of 0.01 to 1 micrometer.

Usable metal salts and metal complex salts include silver nitrate, potassium silver cyanide, potassium gold cyanide, silver ammine complex, silver cyan complex, gold salt or gold cyan complex and the like. Usable reducing agents include formalin, tartaric acid, a tartrate, a hypophosphite, sodium borohydride, dimethylamine borane and the like. The reducing agent may be used in the range of 0.2 to 10 moles, preferably 0.5 to 4 moles per 1 mole of the metal salt or the metal complex salt.

In the optical recording medium of the present invention, recording of information is conducted by applying a spot-like high energy beam such as a laser (for example, semiconductor laser and He-Ne laser) onto the recording layer through the support or from the opposite side of the support. That is to say, light absorbed in the recording layer is converted to heat and pits are formed in the recording layer.

On the other hand, readout of information is conducted by applying a laser beam with a low power equal to or less than the threshold value energy for recording, and detecting the difference in quantity of reflected light or quantity of transmitted light between pitted areas and unpitted areas.

The present invention is further explained in detail below according to the examples, but the scope of the present invention should not be limited thereto.

EXAMPLE 1

A dye and a quencher, and a binder when needed, shown in Table 1 were dissolved in a mixed solvent of methanol, methyl ethyl ketone, dichloroethane and 2,2,3,3-tetrafluorpropanol in a proper ratio. A surface-hardened polycarbonate support with a groove (pitch 1.6 microns, depth 750 Å) was coated with the solution to a thickness of 0.1 micrometer using a spinner, and dried. The weight ratio of the dye to the quencher was 3:1, and in the case of using a binder, the weight thereof was 1/5 of the dye.

Then, a signal of 0.4 MHz was recorded on the thus obtained optical recording medium under the condition of 6 mW on the irradiated surface and the beam diameter of 1.6 micrometers using semiconductor laser, whereby pits having the diameter of 1.0 micrometer were formed with irradiation (1.8 nJ/pit) for 0.3 microsecond. A weak laser beam was applied to the recording areas and signal was read out to obtain C/N ratio indicated in Table 1.

The following evaluation conditions were applied.

| (Recording and readout) | |
|---|---|
| Laser | Semiconductor laser (GaAlAs) |
| Wavelength of laser | 780 nm |
| Beam size of laser | 1.6 micrometers |
| Line speed | 5 m/s |
| Recording power | 8 mW |
| Recording frequency | 2.5 MHz |
| Recording duty | 50% |
| Readout power | 0.4 mW |
| (Evaluation of readout deterioration) | |
| Readout power | 1.0 mW |
| The number of readout | $10^5$ times |
| (Evaluation of deterioration during preservation) | |
| Preservation temperature and humidity | 60° C., 90% RH |
| Preservation time | 30. days |

Comparative compound A

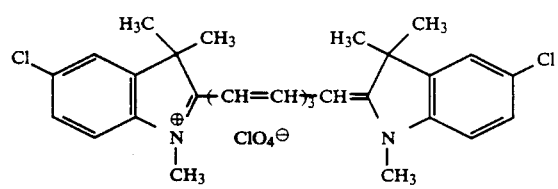

Comparative compound B

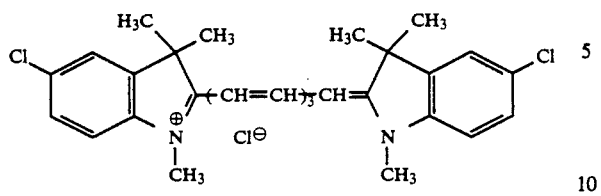

It is seen from the results shown in Table 1 that the information recording media of the present invention has recording performances and stability equal to or better than those of the comparative examples.

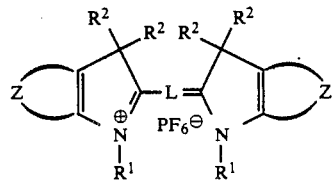

wherein $R^1$ and $R^2$ independently represent a substituted or unsubstituted alkyl group, or a substituted or unsubstituted aryl group, Z represents an atomic group necessary for forming a substituted or unsubstituted aromic ring, and L represents a linking group necessary for forming a mono-, di-, tri- or tetracarbocyanine dye.

TABLE 1

| Sample No. | Dye compound No. | Quencher | Binder | C/N (d/B) | C/N (dB) after forced deterioration test | | Note |
|---|---|---|---|---|---|---|---|
| | | | | | 60° C., 90% RH | 1 mW Continuous readout | |
| 1 | A | — | — | 54 | 45 | 42 | Comparative example |
| 2 | " | II - (2) | — | 52 | 45 | 48 | " |
| 3 | " | — | Nitrocellulose | 53 | 46 | 42 | " |
| 4 | " | II - (4) | Chlorinated paraffine | 52 | 46 | 48 | " |
| 5 | B | — | — | 54 | Measurement was impossible owing to remarkable fading | 32 | Comparative example |
| 6 | " | II - (2) | — | 52 | | 40 | " |
| 7 | " | — | Nitrocellulose | 53 | | 31 | " |
| 8 | " | II - (4) | Chlorinated paraffine | 52 | | 41 | " |
| 9 | 1 | — | — | 54 | 45 | 42 | Present invention |
| 10 | " | II - (2) | — | 52 | 45 | 48 | " |
| 11 | " | — | Nitrocellulose | 53 | 46 | 42 | " |
| 12 | " | II - (4) | Chlorinated paraffine | 52 | 46 | 48 | " |

REFERENCE EXAMPLE

Calorific value around a melting point was measured on the dyes indicated in Table 2 by DSC (differencial scanning calorimetry). As a result, it has been clarified that the perchlorate exhibited a very large calorific value and has the possiblity of explosion, whereas the $PF_6^\ominus$ salt, a compound of the present invention exhibited only a little heat emission and has no possibility of explosion.

TABLE

| Compound | ΔH (cal/g) |
|---|---|
| 1 | −17.22 |
| Comparative compound A | −254.72 |

ΔH is calorific value around a melting point.

As is seen from the foregoing, the optical information recording media of the present invention have an excellent recording performance and stability, and dyes used therein have no explosive property and thus can safely and readily be prepared.

What is claimed is:

1. An optical information recording medium for carrying out recording or readout with laser beams, which comprises a support having carried thereon at least one compound represented by the general formula (I):

2. The optical information recording medium of claim 1, wherein the substituents in the definition of $R^1$, $R^2$ and Z are independently a group whose hydrophobic parameter π is in the range of −0.5 to 15.

3. The optical information recording medium of claim 1, wherein the substituents in the definition of $R^1$ and $R^2$ are independently a halogen atom, a substituted or unsubstituted phenyl group, an alkylthio group, or a substituted or unsubstituted phenylthio group.

4. The optical information recording medium of claim 1, wherein the aromatic ring in the definition of Z is a benzene ring, a naphthalene ring or an anthracene ring.

5. The optical information recording medium of claim 1, wherein Z is substituted with a halogen atom, a substituted or unsubstituted phenyl group, an alkylthio group, a substituted or unsubstituted phenylthio group, a substituted or unsubstituted alkyl group, a cyano group, an alkoxycarbonyl group, an alkylsulfonyl group, or an arylsulfonyl group.

6. The optical information recording medium of claim 1, wherein Z is an atomic group for forming a benzene ring having a substituent whose Hammett's sigma constant is −0.2 to +0.7.

7. The optical information recording medium of claim 1, wherein L is represented by one of the following general formulae (a) to (i):

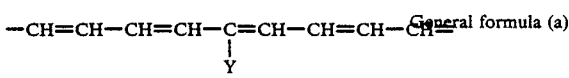

-continued $-CH=CH-\underset{Y}{C}=CH-CH=$ General formula (b)

$=CH-CH\underset{Y}{\diagdown}CH=CH-$ General formula (c)

$-CH=CH\underset{Y}{\diagdown}=CH-CH=$ General formula (d)

General formula (e)

(cyclohexene with gem-dimethyl, $-CH=$ and $-CH=CH-CH=$ substituents)

General formula (f)

(benzofuran-type with $-CH=$ and $-CH=CH-CH=$ substituents)

$=CH-\underset{Y}{C}=CH-CH=CH-$ General formula (g)

$=CH-CH=CH-\underset{Y}{C}=CH-CH=CH-$ General formula (h)

$=CH-\underset{Y}{C}=CH-$ General formula (i)

wherein Y is a hydrogen atom, a lower alkyl group, a substituted or unsubstituted phenyl group, an aralkyl group, a lower alkoxy group, a disubstituted amino group, an alkylcarbonyloxy group, an alkylthio group, a cyano group, a nitro group or a halogen atom.

8. The optical information recording medium of claim 1, which further comprises a singlet oxygen quencher.

9. The optical information recording medium of claim 1, further comprising a quencher which is a compound represented by the general formula (II) or (III):

$$[Cat_1]_n \left[ S=\underset{S}{\overset{S}{\diagdown}}\underset{S}{\overset{S}{\diagup}}M_1\underset{S}{\overset{S}{\diagdown}}\underset{S}{\overset{S}{\diagup}}=S \right]$$ (II)

$$[Cat_2]_n \left[ \underset{S}{\overset{S}{\diagdown}}\underset{\underset{S}{\|}}{\overset{S}{\diagup}}\underset{S}{\overset{S}{\diagdown}}M_2\underset{S}{\overset{S}{\diagup}}\underset{\underset{S}{\|}}{\overset{S}{\diagdown}}\underset{S}{\overset{S}{\diagup}} \right]$$ (III)

wherein [Cat$_1$] and [Cat$_2$] represent cations necessary for making the compound neutral, M$_1$ and M$_2$ independently represent nickel, copper, cobalt, palladium or platinum, and n represents 1 or 2.

10. The optical information recording medium of claim 9, wherein [Cat$_1$] and [Cat$_2$] represent an alkali metal ion, an alkaline earth metal ion or NH$_4^+$.

11. The optical information recording medium of claim 9, wherein [Cat$_1$] and [Cat$_2$] are cations represented by one of the general formulae (IV-a) to (IV-e):

$$\left[ \begin{array}{c} R^{11} \\ R^{12}-N-R^{14} \\ R^{13} \end{array} \right]^+ \quad \text{(IV-a)}$$

$$\left[ \begin{array}{c} Z^1 \\ \diagup \quad \diagdown \\ N \\ R^{15} \end{array} \right]^+ \quad \text{(IV-b)}$$

$$\left[ \begin{array}{c} Z^2 \\ \diagup \quad \diagdown \\ R^{16}-N-R^{17} \end{array} \right]^+ \quad \text{(IV-c)}$$

$$\left[ \begin{array}{c} R^{18} \\ R^{19}-P-R^{21} \\ R^{20} \end{array} \right]^+ \quad \text{(IV-d)}$$

$$\left[ \left( \left( R^{22}-\!\!\left\langle \bigcirc \right\rangle\!\!-\right)_3 P \right)_2 N \right]^+ \quad \text{(IV-e)}$$

wherein R$^{11}$, R$^{12}$, R$^{13}$, R$^{14}$, R$^{15}$, R$^{16}$, R$^{17}$, R$^{18}$, R$^{19}$, R$^{20}$, R$^{21}$ and R$^{22}$ independently represent a substituted or unsubstituted alkyl group having 1 to 20 carbon atoms, or a substituted or unsubstituted aryl group having 6 to 14 carbon atoms, and Z$^1$ and Z$^2$ independently represent a nonmetal atomic group which form a 5-membered or 6-membered ring together with a nitrogen atom or a phosphorous atom.

12. The optical information recording medium of claim 11, wherein the substituents of the alkyl group and aryl group in the definition of R$^{11}$ and R$^{22}$ are independently a cyano group, a hydroxyl group, an alkyl group having 1 to 20 carbon atoms, an aryl group having 6 to 14 carbon atoms, an acyloxy group having 2 to 20 carbon atoms, an alkoxy group having 1 to 6 carbon atoms, an aryloxy group, an aralkyl group, an alkoxycarbonyl group, an aryloxycarbonyl group, an acyl group, an acylamino group, a substituted or unsubstituted carbamoyl group, an alkylsulfonylamino group, an arylsulfonylamino group, a substituted or unsubstituted sulfamoyl group, an alkylsulfonyl group or an arylsulfonyl group.

13. The optical information recording medium of claim 11, wherein the 5-membered ring or 6-membered ring in the definition of Z$^1$ and Z$^2$ is a pyridine ring, an imidazole ring, a pyrrole ring, a 2-pyrroline ring, a pyrrolidine ring, a piperidine ring, a pyrazole ring, a pyrazoline ring or an imidazoline ring.

14. The optical information recording medium of claim 8, wherein the quencher is used in an amount of 0.05 to 12 moles per 1 mole of the compound of the general formula (I).

15. The optical information recording medium of claim 1 wherein the support is glass or plastics.

16. The optical information recording medium of claim 1, wherein $R^1$ or $R^2$ are substituted or unsubstituted lower alkyl groups having 1 to 8 carbon atoms.

17. The optical information recording medium of claim 7, wherein L is selected from the group consisting of general formulae (b), (c), (d), (e), (f), (g) and (h).

* * * * *